United States Patent
Spiro et al.

(10) Patent No.: US 8,162,723 B2
(45) Date of Patent: Apr. 24, 2012

(54) METHOD OF POLISHING A TUNGSTEN CARBIDE SURFACE

(75) Inventors: Clifford Spiro, Naperville, IL (US); George Steuer, Oswego, IL (US); Frank B. Kaufman, Geneva, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 818 days.

(21) Appl. No.: 12/224,902

(22) PCT Filed: Mar. 9, 2007

(86) PCT No.: PCT/US2007/006117
§ 371 (c)(1),
(2), (4) Date: Sep. 9, 2008

(87) PCT Pub. No.: WO2007/103578
PCT Pub. Date: Sep. 13, 2007

(65) Prior Publication Data
US 2009/0103993 A1    Apr. 23, 2009

(51) Int. Cl.
*B24B 1/00*    (2006.01)

(52) U.S. Cl. ............... 451/28; 451/41; 451/56; 451/72; 451/285

(58) Field of Classification Search ............... 451/28, 451/41, 285–289, 56, 72; 125/2, 3, 5
See application file for complete search history.

(56) References Cited

U.S. PATENT DOCUMENTS

| | | | | |
|---|---|---|---|---|
| 1,964,972 A * | 7/1934 | Binns | | 76/115 |
| 3,036,907 A * | 5/1962 | Bibbins | | 75/231 |
| 4,643,620 A * | 2/1987 | Fujii et al. | | 407/119 |
| 5,148,639 A * | 9/1992 | Sakai et al. | | 451/59 |
| 5,720,649 A * | 2/1998 | Gerber et al. | | 451/41 |
| 5,776,588 A * | 7/1998 | Moriguchi et al. | | 428/210 |
| 6,004,189 A * | 12/1999 | Phillips | | 451/49 |
| 6,068,787 A * | 5/2000 | Grumbine et al. | | 252/79.1 |
| 6,096,436 A | 8/2000 | Inspektor | | |
| 6,117,533 A | 9/2000 | Inspektor | | |
| 6,120,352 A * | 9/2000 | Duescher | | 451/41 |
| 6,171,224 B1 * | 1/2001 | Phillips | | 492/59 |
| 6,435,058 B1 * | 8/2002 | Matthias et al. | | 76/108.2 |
| 6,435,947 B2 * | 8/2002 | Mueller et al. | | 451/41 |
| 6,554,548 B1 * | 4/2003 | Grab et al. | | 407/119 |
| 6,866,921 B2 * | 3/2005 | Grab et al. | | 428/212 |
| 7,429,338 B2 * | 9/2008 | Siddiqui | | 216/89 |
| 7,476,437 B2 * | 1/2009 | Jonsson | | 428/212 |
| 2002/0187370 A1 * | 12/2002 | Yamagata et al. | | 428/698 |
| 2002/0197935 A1 | 12/2002 | Mueller et al. | | |
| 2003/0082998 A1 | 5/2003 | Carter et al. | | |
| 2003/0211747 A1 * | 11/2003 | Hegde et al. | | 438/700 |
| 2004/0175948 A1 * | 9/2004 | DeSimone et al. | | 438/690 |
| 2004/0206008 A1 * | 10/2004 | Sung | | 51/307 |
| 2004/0232379 A1 * | 11/2004 | Ameen et al. | | 252/186.1 |
| 2004/0237413 A1 * | 12/2004 | Shida et al. | | 51/309 |
| 2005/0032444 A1 * | 2/2005 | Pettersson et al. | | 442/6 |
| 2005/0126588 A1 * | 6/2005 | Carter et al. | | 134/3 |
| 2006/0189152 A1 * | 8/2006 | Jang et al. | | 438/759 |
| 2007/0004322 A1 * | 1/2007 | Ohashi et al. | | 451/41 |
| 2007/0117497 A1 * | 5/2007 | Moeggenborg et al. | | 451/41 |
| 2007/0155293 A1 * | 7/2007 | Endres et al. | | 451/56 |

* cited by examiner

*Primary Examiner* — George Nguyen
(74) *Attorney, Agent, or Firm* — Thomas E. Omholt; Francis J. Koszyk; Steven D. Weseman

(57) ABSTRACT

The invention is directed to a method for polishing a surface comprising tungsten carbide, comprising contacting a surface comprising tungsten carbide with an oxidizing agent, a polishing component, and a liquid carrier, and abrading at least a portion of the surface to polish the surface. The invention further provides a method for reconditioning a workpiece comprising tungsten carbide. The invention also provides a cutting tool insert having a highly polished surface.

28 Claims, 3 Drawing Sheets

$R_{RMS}$ = 39.2 nm

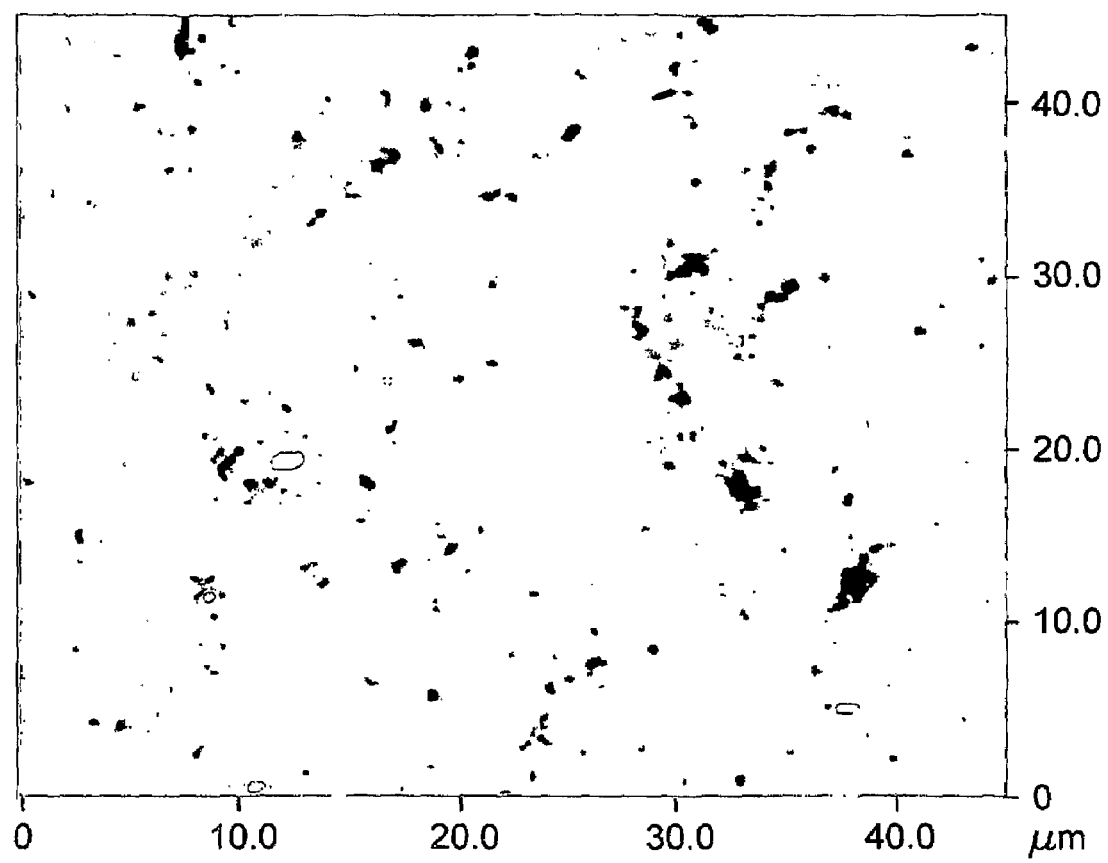

METHOD OF POLISHING A TUNGSTEN CARBIDE SURFACE

FIELD OF THE INVENTION

This invention pertains to a method for polishing a tungsten carbide surface such as on a cutting tool insert.

BACKGROUND OF THE INVENTION

The hardness and toughness of tungsten carbide compositions have made such materials well suited for use in cutting tools and metal forming tools as well as in surface coatings for devices requiring hard, durable surfaces. Typically, a mixture of tungsten carbide and a binder, such as cobalt, chromium, titanium, nickel, and combinations thereof, is pressed into a mold under high pressure, followed by sintering to fuse the mixture and thereby form an article. Tungsten carbide surface coatings are generally formed by processes of coating substrates with tungsten carbide compositions using techniques such as spraying, chemical vapor deposition, physical vapor deposition, sputtering, or plasma deposition.

The articles and surfaces thus formed generally require polishing or grinding to provide smooth surfaces and to obtain precise dimensions for the article or surface. The hardness and toughness of tungsten carbide compositions that makes tungsten carbide so useful provides special challenges in polishing processes. Typically, diamond grit has been used for the polishing of tungsten carbide. Micron-sized particles of diamond grit are either imbedded in a polishing or grinding wheel or imbedded in abrasive films such as are available from the 3M Company. Various processes have been developed to utilize diamond grit in the polishing of tungsten carbide surfaces. U.S. Pat. No. 6,004,189 describes a process of polishing a tungsten carbide surface involving a complex series of operations including oscillating a diamond abrasive film against the surface of a rotating cylinder coated with tungsten carbide.

In machining processes, typically a cutting edge, such as a cutting tool insert, is brought into contact with a metal workpiece to be machined and moved relative to the workpiece to remove metal from the surface of the workpiece. Cutting tool inserts are used in both turning processes, wherein metal is removed from a cylindrical workpiece, and milling processes, wherein metal is removed from a noncylindrical workpiece. As the cutting tool insert cuts into the surface of the workpiece, the insert separates a thin layer of the workpiece surface which moves against the flank face of the cutting tool insert forming a chip. The bottom surface, or the rake face, of the cutting tool simultaneously moves across the newly-formed surface of the workpiece as the surface is machined. Thus, cutting tool inserts having improved surface smoothness are expected to provide for reduced friction with the surface being machined, thereby reducing frictional heating of the workpiece during machining, and further resulting in improved surface quality.

Although tools and surfaces made of tungsten carbide compositions possess exceptional hardness and toughness, surface wear is inevitable and eventually requires reconditioning or replacement of the tool or surface. Often surface coatings such as titanium nitride are applied over tungsten carbide to reduce friction and protect the surface, but such coatings also wear, exposing the underlying tungsten carbide to surface damage. Reconditioning then requires an extra step of stripping the coating followed by regrinding of the surface, increasing the cost of reconditioning.

Despite the utility of diamond-based abrasive methods for the polishing of tungsten carbide articles and surfaces, the expense of diamond coupled with limits for the smoothness achievable by diamond-based abrasives compromises the quality of machining processes and the economics of tool reconditioning processes. Thus, there remains a need for improved methods for the polishing of surfaces comprising tungsten carbide. There also exists a need for cutting tools having improved surface quality for use in the precision machining of workpieces.

The invention provides such a method for the polishing of surfaces comprising tungsten carbide and provides improved cutting tool inserts. These and other advantages of the invention, as well as additional inventive features, will be apparent from the description of the invention provided herein.

BRIEF SUMMARY OF THE INVENTION

The invention is directed to a method for chemically-mechanically polishing a surface comprising tungsten carbide comprising (i) contacting a surface comprising tungsten carbide with a chemical-mechanical polishing system comprising (a) an oxidizing agent, (b) a polishing component selected from the group consisting of an abrasive, a polishing pad, and a combination thereof, and (c) a liquid carrier, and (ii) abrading at least a portion of the surface to polish the surface.

The invention is further directed to a method for reconditioning a workpiece comprising tungsten carbide comprising (i) providing a workpiece comprising tungsten carbide, (ii) contacting the workpiece with a chemical-mechanical polishing system comprising (a) an oxidizing agent, (b) a polishing component selected from the group consisting of an abrasive, a polishing pad, and a combination thereof, and (c) a liquid carrier, and (iii) abrading at least a portion of the tungsten carbide of the workpiece to recondition the workpiece.

The invention also provides a cutting tool insert comprising a composite of tungsten carbide and cobalt and having a rake surface and a flank surface, wherein the rake surface and the flank surface intersect to form a cutting edge, and wherein at least one of the rake surface or the flank surface has an RMS surface roughness of about 50 nm or less.

BRIEF DESCRIPTION OF THE DRAWINGS

FIG. 3 is an atomic force micrograph of a surface of the cutting tool insert illustrated in FIG. 2 after polishing in accordance with the inventive method.

DETAILED DESCRIPTION OF THE INVENTION

Figure 1:
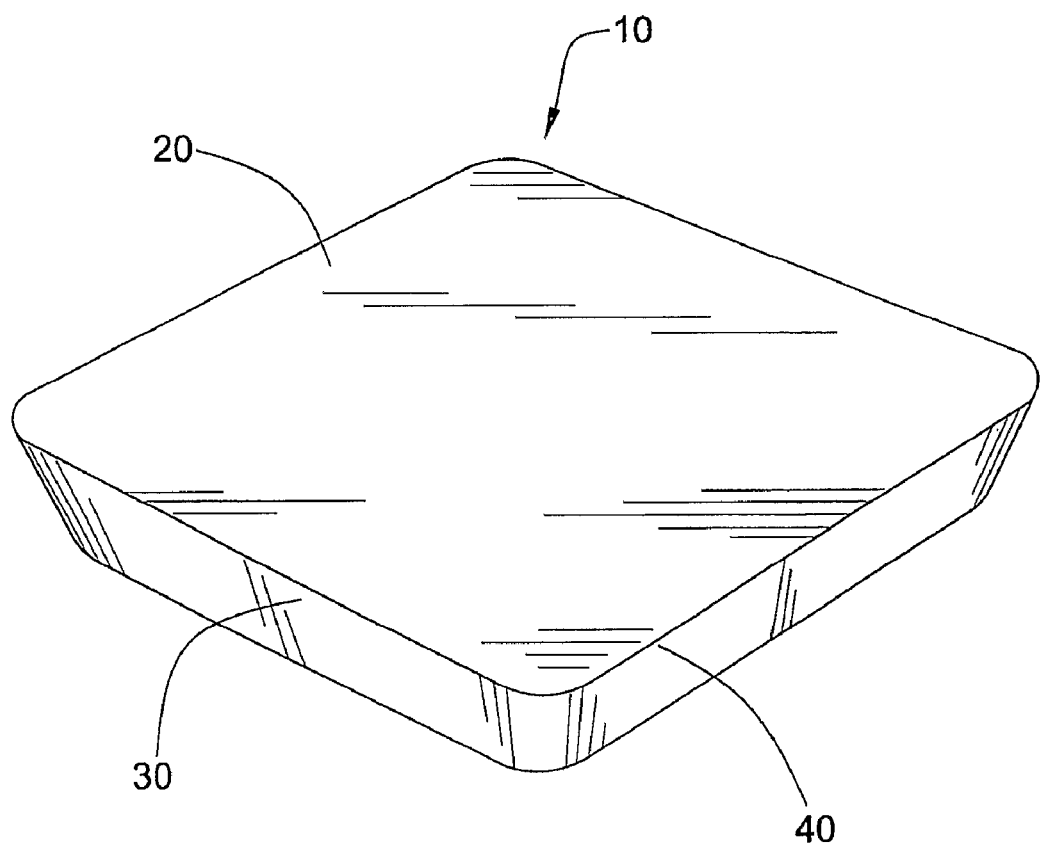
FIG. 1 is a view of a cutting tool insert in accordance with the invention.

The invention provides a method of polishing a surface comprising tungsten carbide. The method comprises (i) contacting a surface comprising tungsten carbide with a chemical-mechanical polishing system comprising (a) an oxidizing agent, (b) a polishing component selected from the group consisting of an abrasive, a polishing pad, and a combination thereof, and (c) a liquid carrier, and (ii) abrading at least a portion of the surface to polish the surface.

The surface comprising tungsten carbide can be a surface of an article comprising tungsten carbide, or the surface can be a surface formed by coating a substrate with a tungsten carbide composition. A wide variety of substrates may be used, including ceramics and metals. Suitable substrates include steel and other hard metals. A preferred substrate includes hardened steel.

Tungsten carbide, in the context of the invention, refers to compounds of tungsten and carbon including WC, $W_2C$, and $WC_n$, wherein n is between 0.5 and 1.0, as well as other combinations of tungsten and carbon. Tungsten carbide can be a component in a composition comprising tungsten carbide and an element selected from the group consisting of cobalt, chromium, nickel, titanium, iron and combinations thereof, wherein the element serves as a binder for tungsten carbide particles and serves to impart hardness and toughness to the composition.

An article comprising tungsten carbide can be produced by any suitable method. Typically, a mixture of tungsten carbide with a binder metal selected from the group consisting of cobalt, chromium, nickel, titanium, iron and combinations thereof is prepared in combination with a polymer or wax. The mixture comprising tungsten carbide, a binder metal, and a polymer or wax is forced into a mold under pressure applied by a press to provide a "green" compact. The compact can be machined into a desired shape at this stage (e.g., after molding) or further processed into a finished article without intermediate forming steps. In the final step, the polymer or wax is first removed by heating the tungsten carbide mixture under reduced pressure to effect removal of polymer or wax by liquifaction or volatilization, and the tungsten carbide composition is then sintered by heating to a temperature generally below the melting point of the binder to form the article, either in a vacuum or in a reducing atmosphere (e.g., a hydrogen atmosphere).

The present invention includes surface-treaded articles comprising tungsten carbide of various compositions. Suitable tungsten carbide compositions include those with binders including cobalt, nickel, and also substantially "binder-less" tungsten carbide preparations. The tools and components of the present invention include those produced in bulk tungsten carbide material sets by sintering, thin or thick films that have been produced in bulk and brazed or otherwise mechanically or physically attached to the surface of another material, and also sprayed or otherwise applied coatings of nominal WC composition including air pressure plasma spraying, low pressure plasma spraying, direct-current or arc plasma spraying, and high velocity oxygen flame sprayed, and the like.

The surface comprising tungsten carbide also can be a surface formed by coating a substrate comprising a different material with a tungsten carbide composition. The tungsten carbide composition, which can be as described herein, typically is produced in the form of a fine powder for application to the surface of a substrate. Suitable methods for coating a substrate with a tungsten carbide composition include techniques such as spraying, chemical vapor deposition, physical vapor deposition, sputtering, or plasma deposition.

The surface is contacted with a chemical-mechanical polishing system comprising (a) an oxidizing agent, (b) a polishing component selected from the group consisting of an abrasive, a polishing pad, and a combination thereof, and (c) a liquid carrier. The oxidizing agent, abrasive (when an abrasive is present and is suspended in the liquid carrier), liquid carrier, and optional components dissolved or suspended in the liquid carrier form the chemical-mechanical polishing composition of the polishing system.

The oxidizing agent can be any suitable oxidizing agent. Preferably, the oxidizing agent is selected from the group consisting of bromates, bromites, chlorates, chlorites, hydrogen peroxide, hypochlorites, iodates, monoperoxy sulfate, monoperoxy sulfite, monoperoxyphosphate, monoperoxyhypophosphate, monoperoxypyrophosphate, organo-halo-oxy compounds, periodates, permanganate, peroxyacetic acid, and mixtures thereof. More preferably, the oxidizing agent is hydrogen peroxide.

The polishing composition can comprise any suitable amount of the oxidizing agent. Typically, the polishing composition comprises about 0.1 wt. % or more (e.g., about 0.2 wt. % or more, about 0.5 wt. % or more, or about 1 wt. % or more) oxidizing agent, based on the weight of the liquid carrier and any components dissolved or suspended therein. The polishing composition preferably comprises about 20 wt. % or less (e.g., about 15 wt. % or less, or about 10 wt. % or less) oxidizing agent, based on the weight of the liquid carrier and any components dissolved or suspended therein.

The chemical-mechanical polishing system optionally further comprises a catalyst. Although not wishing to be bound by any particular theory, it is believed that the oxidizing agent serves to convert the surface comprising tungsten carbide into soluble ionic species or into a soft, easily abradable film that is readily abraded by the polishing component of the chemical-mechanical polishing system. The catalyst when present has at least two oxidation states and is believed to participate by oxidizing the surface comprising tungsten carbide thereby undergoing reduction, followed by reoxidation to an oxidatively active catalyst species by the oxidizing agent present in the chemical-mechanical polishing system. The catalyst or catalysts chosen may be metallic, non-metallic, or a combination thereof and the catalyst must be able to shuffle electrons efficiently and rapidly between the oxidizer and metal substrate surface. Preferably, the catalyst is an iron catalyst. More preferably, the catalyst comprises a ferric or ferrous compound. Such a catalyst is preferably prepared by mixing ferric nitrate into an abrasive slurry together with a chelating agent such as malonic acid to improve stability.

The amount of catalyst in the chemical mechanical composition of this invention may be varied depending upon the oxidizing agent used. When the preferred oxidizing agent hydrogen peroxide (or its analogs) is used in combination with a preferred catalyst such as a ferric compound, the catalyst will preferably be present in the composition in an amount sufficient to provide approximately 5 to 3000 ppm Fe based on the total weight of the composition The chemical-mechanical polishing system comprises a polishing component selected from the group consisting of an abrasive, a polishing pad, and a combination thereof. The polishing system described herein desirably comprises an abrasive and a polishing pad. The abrasive can be in any suitable form (e.g., abrasive particles). The abrasive can be fixed on the polishing pad and/or can be in particulate form and suspended in the liquid carrier.

The abrasive can be any suitable abrasive. The abrasive preferably is selected from the group consisting of alumina, ceria, silica, titania, and zirconia. More preferably, the abrasive is silica.

The silica can be any suitable form of silica. Suitable forms of silica include fumed silica and colloidal silica. Fumed silica is typically prepared by a pyrogenic process, in which a suitable precursor, such as silicon tetrachloride, undergoes vapor phase hydrolysis at high temperatures. Colloidal silica useful in the context of the invention includes wet-process type silica particles (e.g., condensation-polymerized silica particles). Condensation-polymerized silica particles typically are prepared by condensing $Si(OH)_4$ to form colloidal particles, where colloidal is defined as having an average particle size between about 1 nm and about 1000 nm. Such abrasive particles can be prepared in accordance with U.S.

Pat. No. 5,230,833 or can be obtained as any of various commercially available products, such as the Akzo-Nobel Bindzil 50/80 product and the Nalco 1050, 2327, and 2329 products, as well as other similar products available from DuPont, Bayer, Applied Research, Nissan Chemical, and Clariant.

The abrasive particles typically have an average particle size (e.g., average particle diameter) of about 20 nm to about 500 nm. Preferably, the abrasive particles have an average particle size of about 70 nm to about 300 nm (e.g., about 100 nm to about 200 nm). In the context of the invention, the diameter of a non-spherical particle is the diameter of the smallest sphere that incorporates the particle.

The abrasive can be present in any suitable amount. Typically, about 0.001 wt. % or more abrasive (e.g., about 0.01 wt. % or more) can be present in the polishing composition. The amount of abrasive in the polishing composition preferably will not exceed about 40 wt. %, and more preferably will not exceed about 20 wt. % (e.g., will not exceed about 10 wt. %). Even more preferably, the amount of the abrasive will be about 0.01 wt. % to about 10 wt. % of the polishing composition.

When the abrasive is suspended in the polishing composition, more specifically in the liquid carrier of the polishing composition, the abrasive preferably is colloidally stable. The term colloid refers to the suspension of abrasive particles in the liquid carrier. Colloidal stability refers to the maintenance of that suspension over time. In the context of this invention, an abrasive is considered colloidally stable if, when the abrasive is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leqq 0.5$). The value of $[B]-[T]/[C]$ desirably is less than or equal to 0.3, and preferably is less than or equal to 0.1.

The polishing component can comprise a polishing pad (e.g., polishing surface). The polishing pad can be any suitable polishing pad, many of which are known in the art. Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, conformed products thereof, and mixtures thereof.

The polishing pad can comprise fixed abrasive particles on or within the polishing surface of the polishing pad, or the polishing pad can be substantially free of fixed abrasive particles. Fixed abrasive polishing pads include pads having abrasive particles affixed to the polishing surface of the polishing pad by way of an adhesive, binder, ceramer, resin, or the like or abrasives that have been impregnated within a polishing pad so as to form an integral part of the polishing pad, such as, for example, a fibrous batt impregnated with an abrasive-containing polyurethane dispersion. Fixed abrasive pads can eliminate the need for providing an abrasive component in the polishing composition.

The polishing pad can have any suitable configuration. For example, the polishing pad can be circular and, when in use, typically will have a rotational motion about an axis perpendicular to the plane defined by the surface of the pad. The polishing pad can be cylindrical, the surface of which acts as the polishing surface, and when in use have a rotational motion about the central axis of the cylinder. The polishing pad can be in the form of an endless belt, which when in use has a linear motion with respect to the cutting edge being polished. The polishing pad can have any suitable shape, and when in use have a reciprocating or orbital motion along a plane or a semicircle. Many other variations will be readily apparent to the skilled artisan.

The liquid carrier can be any suitable liquid carrier. The purpose of the liquid carrier is to facilitate the application of the components of the polishing composition to the substrate surface to be polished. Typically, the liquid carrier is water, a mixture of water and a suitable water-miscible solvent, or an emulsion. Preferably, the liquid carrier comprises, consists essentially of, or consists of water, more preferably deionized water.

The chemical-mechanical polishing composition can have any suitable pH. Typically, the polishing composition will have a pH of about 12 or less (e.g., about 11 or less, or about 10 or less). Preferably, the polishing composition will have a pH of about 1 or more (e.g., about 2 or more, or about 3 or more).

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be potassium hydroxide, sodium hydroxide, ammonium hydroxide, or a combination thereof. The pH buffering agent can be any suitable buffering agent, for example, phosphates, acetates, borates, ammonium salts, and the like. The chemical-mechanical polishing composition can comprise any suitable amount of a pH adjustor and/or a pH buffering agent, provided such amount is sufficient to achieve and/or maintain the pH of the polishing system within the ranges set forth herein.

The chemical-mechanical polishing composition optionally further comprises one or more other additives. Such additives include any suitable surfactant and/or rheological control agent, including viscosity enhancing agents and coagulants (e.g., polymeric rheological control agents, such as, for example, urethane polymers), acrylates comprising one or more acrylic subunits (e.g., vinyl acrylates and styrene acrylates), and polymers, copolymers, and oligomers thereof, and salts thereof. Suitable surfactants include, for example, cationic surfactants, anionic surfactants, anionic polyelectrolytes, nonionic surfactants, amphoteric surfactants, fluorinated surfactants, mixtures thereof, and the like.

The chemical-mechanical polishing composition optionally further comprises an antifoaming agent. The anti-foaming agent can be any suitable anti-foaming agent. Suitable antifoaming agents include, but are not limited to, silicon-based and acetylenic diol-based antifoaming agents. The amount of anti-foaming agent present in the polishing composition typically is about 40 ppm to about 140 ppm.

The chemical-mechanical polishing composition optionally further comprises a biocide. The biocide can be any suitable biocide, for example an isothiazolinone biocide. The amount of biocide used in the polishing composition typically is about 1 to about 50 ppm, preferably about 10 to about 20 ppm.

The chemical-mechanical polishing composition optionally comprises a stabilizer. Hydrogen peroxide and other per compounds useful as oxidizing agents in the inventive method may not be stable in the presence of many metal ions without the use of stabilizers. The metal ions can be introduced with the optional catalyst, or the metal ions can arise during the chemical-mechanical polishing of the tungsten carbide surface. Without the stabilizer, the metal ion or ions and the per compound may react in a manner that degrades the per compound over time. The stabilizer may also interact with the optional catalyst and degrade the effectiveness of the catalyst. Therefore, the selection of the choice and of the amount of the stabilizer can be important and can influence the effectiveness of the polishing composition.

Useful stabilizers include but are not limited to phosphoric acid, organic acids (e.g., malonic acid, citric acid, adipic acid, oxalic acid, phthalic acid, and ethylenediaminetetraacetic acid), nitriles, and other ligands that are capable of binding to metal ions and reduce their reactivity towards per compounds. It will be appreciated that the aforementioned acids can exist in the form of a salt (e.g., a metal salt, an ammonium salt, or the like), an acid, or as a partial salt thereof. For example, malonates include malonic acid, as well as mono- and di-salts thereof. Preferred stabilizers are selected from the group consisting of malonic acid, citric acid, adipic acid, oxalic acid, and mixtures thereof. An especially preferred stabilizer is malonic acid.

The stabilizer can be present in the chemical-mechanical polishing composition in any suitable amount. If a catalyst is present in the chemical-mechanical polishing system, desirably, the amount of stabilizer is based on the amount of catalyst that is present in the system. Preferably, the amount of stabilizer will be about 1 molar equivalent or more (e.g., about 2 molar equivalents or more). The amount of stabilizer will typically be less than about 5 molar equivalents.

The polishing composition also can comprise a corrosion inhibitor (i.e., a film-forming agent). The corrosion inhibitor can be any suitable corrosion inhibitor. Typically, the corrosion inhibitor is an organic compound containing a heteroatom-containing functional group. For example, the corrosion inhibitor can be a heterocyclic organic compound with at least one 5- or 6-member heterocyclic ring as the active functional group, wherein the heterocyclic ring contains at least one nitrogen atom, for example, an azole compound. Preferably, the corrosion inhibitor contains at least one azole group. More preferably, the corrosion inhibitor is selected from the group consisting of 1,2,3-triazole, 1,2,4-triazole, benzotriazole, benzimidazole, benzothiazole, and mixtures thereof. The amount of corrosion inhibitor used in the polishing system typically is about 0.0001 wt. % to about 3 wt. % (preferably about 0.001 wt. % to about 2 wt. %) based on the total weight of the polishing composition.

The surface comprising tungsten carbide can be polished by any suitable technique. In a preferred method of chemically-mechanically polishing the surface comprising tungsten carbide, the surface typically will be pressed against a polishing pad in the presence of the polishing composition under controlled chemical, pressure, velocity, and temperature conditions. The preferred method of chemically-mechanically polishing a surface is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds an article to be polished by contacting and moving relative to the surface of the polishing pad. The article having the surface to be polished can be mounted in a carrier that is adjustable with respect to the angle at which the surface contacts the polishing pad. The polishing of the substrate takes place by the surface being placed in contact with the polishing pad and the polishing composition of the invention and then the polishing pad moving relative to the surface (with the polishing composition therebetween), so as to abrade at least a portion of the surface to polish the surface.

Polishing refers to the removal of at least a portion of a surface to polish the surface. Polishing can be performed to provide a surface having reduced surface roughness by removing gouges, crates, pits, and the like, but it will be appreciated that polishing can also be performed to introduce or restore a surface geometry characterized by an intersection of planar segments. For example, where two surfaces intersect to define an edge, polishing of at least one of the surfaces by abrading at least a portion of the surface results in an alteration of the geometry of the edge. In embodiments wherein the one or more surfaces define an edge that is used in a cutting operation (e.g., in polishing of cutting tools), polishing of the surface can result in a redefinition or resharpening of the edge.

The chemical-mechanical polishing composition can be formulated prior to delivery to the polishing pad or to the surface of an article. The polishing composition can also be formulated (e.g., mixed) on the surface of the polishing pad or on the surface of the article, through delivery of the components of the polishing composition from two or more distinct sources, whereby the components of the polishing composition meet at the surface of the polishing pad or at the surface of the article. In this regard, the flow rate at which the components of the polishing composition are delivered to the polishing pad or to the surface of the article (i.e., the delivered amount of the particular components of the polishing composition) can be altered prior to the polishing process and/or during the polishing process, such that the polishing selectivity and/or viscosity of the polishing composition is altered. Moreover, it is suitable for the particular components of the polishing composition being delivered from two or more distinct sources to have different pH values, or alternatively to have substantially similar, or even equal, pH values, prior to delivery to the surface of the polishing pad or to the surface of the article. It is also suitable for the particular components being delivered from two or more distinct sources to be filtered either independently or to be filtered jointly (e.g., together) prior to delivery to the surface of the polishing pad or to the surface of the cutting edge.

The invention further provides a method for reconditioning a workpiece comprising tungsten carbide, the method comprising (i) providing a workpiece comprising tungsten carbide, (ii) contacting the workpiece with a chemical-mechanical polishing system comprising (a) an oxidizing agent, (b) a polishing component selected from the group consisting of an abrasive, a polishing pad, and a combination thereof, and (c) a liquid carrier, and (iii) abrading at least a portion of the tungsten carbide of the workpiece to recondition the workpiece.

Any suitable workpiece comprising tungsten carbide can be reconditioned in accordance with the inventive method. Typically, workpieces suitable for reconditioning by the inventive method are cutting devices used in metalworking processes which are subjected to wear and erosion during use. Examples of suitable workpieces include but are not limited to cutting tool inserts, milling cutters, drills, hobs, shaper cutters, and the like. Reconditioning a workpiece generally involves removal of at least a portion of the tungsten carbide-containing surface of the workpiece in order to redefine or sharpen edges of the workpiece, and to remove surface defects such as chips, burrs, and the like resulting from mechanical damage to the workpiece during use.

The characteristics of the chemical-mechanical polishing system (e.g., the oxidizing agent, the polishing component, and the liquid carrier) can be the same as described herein for the chemical-mechanical polishing system of the invention. Similarly, the characteristics of the abrading process in the context of the inventive reconditioning method can be the same as described herein for the abrading process in the context of the inventive polishing method.

The workpiece can comprise at least one surface coating prior to being contacted with the chemical-mechanical polishing system. Typical surface coatings applied to workpieces comprising tungsten carbide are selected from the group consisting of titanium nitride, aluminum titanium nitride, titanium aluminum nitride, titanium carbonitride, aluminum oxide, and combinations thereof. The surface coating can comprise one or more layers of the same or different materials. Surface coatings on workpieces are damaged during use through flaking of the surface coating, which increases surface roughness of the workpiece. Generally, surface coatings are removed by the use of chemical stripping solutions. The chemical stripping solutions preferentially attack and remove, for example, nitride-based coatings but will undesirably react to some extent with the carbide constituents in the substrate microstructure. Advantageously, the at least one surface coating can be removed (in whole or in part) by contact with the chemical-mechanical polishing system. Thus, the reconditioning method of the invention allows for controlled removal of surface coatings from workpieces comprising tungsten carbide and allows for polishing of the underlying tungsten carbide surface to provide a reconditioned surface without requiring a separate step of removing the surface coating.

The inventive reconditioning method also provides an additional optional step of applying at least one surface coating to the workpiece after abrading at least a portion of the tungsten carbide of the workpiece. Preferably, the surface coating is selected from the group consisting of titanium nitride, aluminum titanium nitride, titanium aluminum nitride, titanium carbonitride, aluminum oxide, and combinations thereof. More preferably, the surface coating is titanium nitride. The surface coating can be applied by any suitable technique, for example by chemical vapor deposition or physical vapor deposition.

The invention also provides a cutting tool insert comprising a composite of tungsten carbide and cobalt. Referring to FIG. 1, the cutting tool insert (10) has a rake surface (20) and a flank surface (30), wherein the rake surface and the flank surface intersect to form a cutting edge (40) and wherein at least one of the rake surface or the flank surface has an RMS surface roughness of about 50 nm or less.

The composite of tungsten carbide and cobalt can be any suitable composite, many of which are known in the art. The composite can further comprise additional materials and in particular can further comprise elements selected from the group consisting of cobalt, chromium, nickel, titanium, iron, and combinations thereof. In some cases the elements can form carbides or other inorganic compounds under the conditions of preparation of the composite. Typically, the composite can comprise about 10 wt. % to about 95 wt. % tungsten carbide and about 95 wt. % to about 5 wt. % cobalt based on the total weight of the composite. In a preferred embodiment the composite comprises about 5 wt. % to about 20 wt. % cobalt and about 95 wt. % to about 80 wt. % tungsten carbide based on the total weight of the composite.

The additional elements (e.g., cobalt, chromium, nickel, titanium, iron, and combinations thereof) can be present in any suitable amount but will typically be present from about 1 wt. % to about 20 wt. %.

The cutting tool insert can be produced by any suitable technique. Typically, the cutting tool insert will be produced by a powder metallurgy technique as discussed above in which tungsten carbide, cobalt, and optional additional elements are combined by any suitable technique (e.g., ball milling), pressed into a mold under pressure, and sintered to form an as-sintered cutting tool insert. The as-sintered cutting tool insert can be pre-processed before polishing by the inventive tool, for example, by grinding with a diamond abrasive grinding wheel to provide a desired geometry and surface smoothness. However, the as-sintered cutting tool insert can be directly polished by the inventive method without any preliminary processing.

Although FIG. 1 depicts one particular embodiment of the cutting tool insert of the invention, it will be understood that the cutting tool insert can have any suitable geometry, many of which are well known in the art. The cutting tool insert also can have additional features such as a chip cutter and the like.

The root mean square (RMS) surface roughness can be measured by any suitable method. The American Society of Mechanical Engineers (ASME) standard B46.1-2002 contains descriptions of methods used to measure and express surface roughness. A particularly useful method for measuring RMS surface roughness is atomic force microscopy (AFM) in which a stylus is moved over a surface being measured, and the position of the stylus in a vertical direction is recorded at various points along the surface. The RMS surface roughness is then calculated from the deviation from the mean height of the surface over all measurements.

The cutting tool insert of the invention can have any suitable geometry, and the cutting edge of the insert can also can any suitable geometry. Typically, the cutting edge will have a sharp edge defined by a sharp edge, a rounded edge, or a chamfered edge.

The cutting tool insert is characterized by at least one of a rake or a flank surface having a RMS surface roughness of about 50 nm or less (e.g., about 40 nm or less, or about 30 nm or less, or even about 25 nm or less).

It has been discovered that certain articles having tungsten carbide surfaces polished according to this invention exhibit significantly enhanced features and applications. For example, medical-use bladed instruments (e.g., osteotomes) and other medical instruments having nominal tungsten carbide surfaces polished according to this invention exhibit reduced tissue trauma and reduce pathogenic entrapment. Pistons and cylinder walls having tungsten carbide surfaces polished according to the present invention exhibit significantly reduced wear rates. When polished according to the present invention, the tungsten carbide surfaces of the following articles also have reduced mechanical wear rates: cavity rotors, swing shafts, drill bits, cylinder rods, gate valves, plungers, seal and bearing fits, valve stems, impellers, impeller shafts, landing gear joints, turbine shafts, bearing journals on turbine shafts and compressor hubs.

EXAMPLE

This example further illustrates the invention but, of course, should not be construed as in any way limiting its scope. This example demonstrates the reconditioning of a TiN-coated cutting tool insert in accordance with the invention.

A surface of a commercially available cutting tool insert comprising a composite of tungsten carbide and cobalt and surface coated with TiN was examined by atomic force microscopy (AFM) and found to have a RMS surface roughness of 39.2 nm.

The cutting tool insert was then subjected to chemical-mechanical polishing with a commercially available polishing composition comprising silica, hydrogen peroxide, and water (Cabot Microelectronics Semi-Sperse W-2000 polishing composition), using a conventional CMP tool. The cutting tool insert was polished for about 2 minutes with no downforce added to the weight of the pad carrier. The polishing parameters were as follows: 74 rpm platen speed, 60 rpm carrier speed, 100 mL/min polishing composition flow rate, and ex-situ conditioning of a 30.5 cm (12 inch) concentric grooved polishing pad.

The polished surface of the cutting tool insert was then examined by AFM as described above, and found to have a RMS surface roughness of 12.7 nm. Visual inspection confirmed the removal of the characteristically golden TiN coating.

Figure 2:
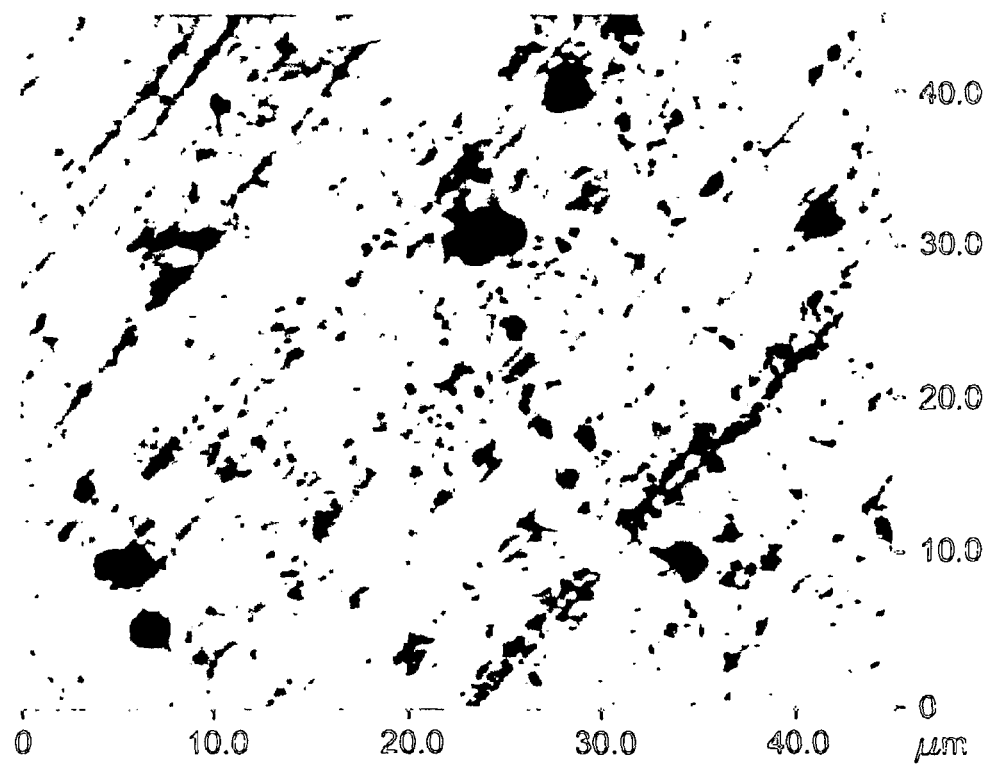
FIG. 2 is an atomic force micrograph of a surface of a commercially available titanium nitride coated cutting tool insert.

The atomic force data traces of the commercially available cutting tool insert surface and of the insert surface polished in accordance with the invention are shown in FIG. 2 and FIG. 3, respectively. As can be seen from FIGS. 2 and 3, parallel grooves are apparent on the commercially available cutting tool insert surface. The surface polished in accordance with the invention appears to be devoid of grooves.

Thus, the results of this example demonstrate the reconditioning of a coated cutting tool insert and significant improvement in surface roughness of the insert resulting from polishing in accordance with the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of chemically-mechanically polishing a surface of a cutting tool insert comprising tungsten carbide comprising:
    (i) contacting the surface comprising tungsten carbide with a chemical-mechanical polishing system comprising:
        (a) an oxidizing agent,
        (b) a polishing component selected from the group consisting of an abrasive, a polishing pad, and a combination thereof,
        (c) a catalyst, and
        (d) a liquid carrier, and
    (ii) abrading at least a portion of the surface to polish the surface.

2. The method of claim 1, wherein the oxidizing agent is selected from the group consisting of bromates, bromites, chlorates, chlorites, hydrogen peroxide, hypochlorites, iodates, monoperoxy sulfate, monoperoxy sulfite, monoperoxyphosphate, monoperoxyhypophosphate, monoperoxypyrophosphate, organo-halo-oxy compounds, periodates, permanganate, peroxyacetic acid, and mixtures thereof.

3. The method of claim 1, wherein the catalyst comprises ferric ion.

4. The method of claim 1, wherein the abrasive is selected from the group consisting of alumina, ceria, silica, titania, and zirconia.

5. The method of claim 4, wherein the abrasive is silica.

6. The method of claim 1, wherein the polishing system comprises an abrasive wherein the abrasive is suspended in the liquid carrier.

7. The method of claim 1, wherein the polishing system comprises an abrasive wherein the abrasive is fixed to a polishing pad.

8. The method of claim 1, wherein the polishing system further comprises one or more components selected from the group consisting of corrosion inhibitors, pH adjustors, film-forming agents, and surfactants.

9. The method of claim 1, wherein the surface further comprises a binder selected from the group consisting of cobalt, chromium, nickel, titanium, iron, and combinations thereof.

10. The method of claim 9, wherein the binder is a combination of cobalt and chromium.

11. The method of claim 10, wherein the binder is cobalt.

12. The method of claim 1, wherein the surface is polished with an RMS surface roughness of about 50 nm or less.

13. A method for reconditioning a cutting device workpiece comprising tungsten carbide and titanium nitride comprising:
    (i) providing the workpiece comprising tungsten carbide and titanium nitride,
    (ii) contacting the workpiece with a chemical-mechanical polishing system comprising:
        (a) an oxidizing agent,
        (b) a polishing component selected from the group consisting of an abrasive, a polishing pad, and a combination thereof,
        (c) a catalyst, and
        (d) a liquid carrier, and (iii) abrading at least a portion of the tungsten carbide and titanium nitride of the workpiece to recondition the workpiece.

14. The method of claim 13, further comprising a step (iv) of applying at least one surface coating to the workpiece.

15. The method of claim 14, wherein the at least one surface coating is selected from the group consisting of titanium nitride, aluminum titanium nitride, titanium aluminum nitride, titanium carbonitride, aluminum oxide, and combinations thereof.

16. The method of claim 13, wherein the workpiece being polished comprises at least one surface coating prior to contacting the workpiece with the chemical-mechanical polishing system.

17. The method of claim 16, wherein the at least one surface coating is selected from the group consisting of titanium nitride, aluminum titanium nitride, titanium aluminum nitride, titanium carbonitride, aluminum oxide, and combinations thereof.

18. The method of claim 17, wherein the surface coating is titanium nitride.

19. The method of claim 13, wherein the oxidizing agent is selected from the group consisting of bromates, bromites, chlorates, chlorites, hydrogen peroxide, hypochlorites, iodates, monoperoxy sulfate, monoperoxy sulfite, monoperoxyphosphate, monoperoxyhypophosphate, monoperoxypyrophosphate, organo-halo-oxy compounds, periodates, permanganate, peroxyacetic acid, and mixtures thereof.

20. The method of claim 13, wherein the catalyst comprises ferric ion.

21. The method of claim 13, wherein the abrasive is selected from the group consisting of alumina, ceria, silica, titania, and zirconia.

22. The method of claim 21, wherein the abrasive is silica.

23. The method of claim 13, wherein the polishing system comprises an abrasive wherein the abrasive is suspended in the liquid carrier.

24. The method of claim 13, wherein the polishing system comprises an abrasive fixed to a polishing pad.

25. The method of claim 13, wherein the polishing system further comprises one or more components selected from the group consisting of corrosion inhibitors, pH adjustors, film-forming agents, and surfactants.

26. The method of claim 13, wherein the workpiece further comprises a binder selected from the group consisting of cobalt, chromium, nickel, titanium, iron, and combinations thereof.

27. The method of claim 26, wherein the binder is a combination of cobalt and chromium.

28. The method of claim 27, wherein the binder is cobalt.

* * * * *